United States Patent
Spatafora

[11] Patent Number: 5,865,595
[45] Date of Patent: Feb. 2, 1999

[54] PRODUCT MANIPULATING UNIT

[75] Inventor: Mario Spatafora, Bologna, Italy

[73] Assignee: Azionaria Cotruzioni Macchine Automatiche A.C.M.A. S.p.A., Bologna, Italy

[21] Appl. No.: 795,381

[22] Filed: Feb. 4, 1997

[30] Foreign Application Priority Data

Feb. 5, 1996 [IT] Italy ................................ BO96A0051

[51] Int. Cl.⁶ .................................................. B65G 37/00
[52] U.S. Cl. ................................... 414/744.5; 198/474.1; 198/476.1
[58] Field of Search ...................... 414/744.5; 198/470.1, 198/474.1, 476.1, 477.1

[56] References Cited

U.S. PATENT DOCUMENTS

| | | |
|---|---|---|
| 2,408,599 | 10/1946 | Bennett . |
| 3,442,966 | 1/1969 | Iansons ................................ 414/744.5 |
| 3,608,744 | 9/1971 | Ward et al. ........................... 414/744.5 |
| 3,659,694 | 5/1972 | Harris . |
| 4,506,779 | 3/1985 | Seragnoli ............................. 198/474.1 |
| 4,753,275 | 6/1988 | Schaltegger .......................... 198/474.1 |
| 4,773,525 | 9/1988 | Gertitschke .......................... 198/476.1 |
| 4,823,536 | 4/1989 | Manservigi et al. . |
| 4,902,192 | 2/1990 | Ziegler ................................ 198/476.1 |
| 5,154,278 | 10/1992 | Deutsch . |

FOREIGN PATENT DOCUMENTS

| | | |
|---|---|---|
| 0 608 823 | 8/1994 | European Pat. Off. . |
| 42 19 631 | 12/1993 | Germany . |
| 2 067 150 | 7/1981 | United Kingdom . |

*Primary Examiner*—Karen M. Young
*Assistant Examiner*—Gregory A. Morse
*Attorney, Agent, or Firm*—Christensen O'Connor Johnson & Kindness PLLC

[57] ABSTRACT

A unit for manipulating products, wherein a conveying device presents at least one operating head for feeding a respective product along a supply path extending about an axis of rotation of the conveying device and through a number of manipulating stations; the operating head being an orientable operating head, and cooperating, at each manipulating station, with an operating head of fixed orientation and movable along a respective work path extending along the supply path at least at the respective manipulating station.

27 Claims, 2 Drawing Sheets

PRODUCT MANIPULATING UNIT

BACKGROUND OF THE INVENTION

The present invention relates to a product manipulating unit.

More specifically, the present invention relates to a unit for manipulating products such as food products (e.g. sweets, chocolates) and/or packets for food or various other types of products, which are variously manipulated for forming wrappings about or for simply surface treating the products.

Known product manipulating units normally comprise a conveying device presenting at least one conveying head for feeding a respective product along a given supply path extending through a number of manipulating stations; and, for each manipulating station, a manipulating device in turn comprising an operating head movable along a respective work path.

The conveying head of such known manipulating units is a passive type, i.e. is simply capable of conveying the respective product along the supply path with no change in its own orientation, whereas each operating head is an adaptive type, i.e. featuring respective orienting devices for so moving the head as to adapt the orientation of the head and the work path to the supply path traveled by the conveying head and respective product at the relative manipulating station.

Known manipulating units of the above type present several technical and functional drawbacks. To begin with, providing each manipulating station with an operating head and respective orienting devices makes for a unit of relatively complex design, which is both difficult and expensive to produce. Moreover, to synchronize the conveying and operating heads, each operating head requires numerous highly complex adjustments, and involves a good deal of in-service maintenance, thus impairing the output capacity of the unit.

SUMMARY OF THE INVENTION

It is an object of the present invention to provide a unit of the type described above, designed to overcome the aforementioned drawbacks.

According to the present invention, there is provided a unit for manipulating products, the unit comprising a conveying device presenting at least a first operating head for feeding a respective product along a first given supply trajectory, the first trajectory extending about a first axis of rotation of the conveying device and through a number of manipulating stations; and a manipulating device in turn comprising, for each manipulating station, a second operating head movable along a respective work trajectory; characterized by comprising orienting means associated with the first operating head to vary the orientation of the first operating head along, and in relation to, the first trajectory at least at each manipulating station; said work trajectories extending about respective fixed axes parallel to the first axis; and said second operating heads being fixed operating heads, the orientation of which is invariable in relation to the respective work trajectories.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
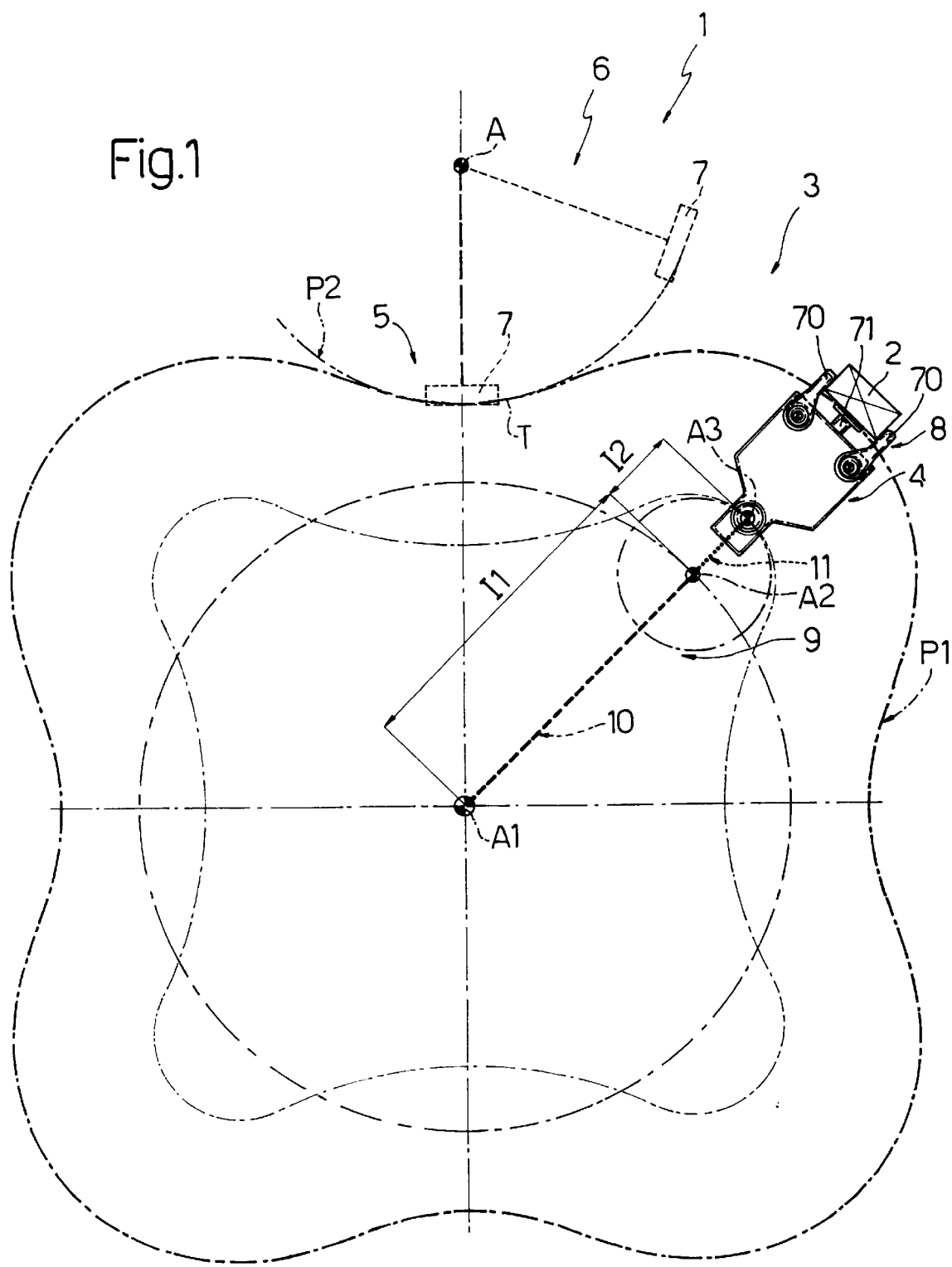
FIG. 1 shows a schematic view, with parts removed for clarity, of a preferred embodiment of the unit according to the present invention.

Number 1 in FIG. 1 indicates a unit for manipulating products 2, and comprising a conveying device 3 presenting at least one operating head 4 for feeding a respective product 2 along a supply path P1 extending about an axis A1 of rotation of conveying device 3 and through a number of manipulating stations 5 (only one shown).

Unit 1 also comprises a manipulating device 6 in turn comprising, for each station 5, a further operating head 7 traveling along a respective work path P2 extending about a fixed axis A of rotation of head 7, parallel to axis A1. For each station 5, path P1 presents a portion T, which, at least at station 5, is superimposed on and duplicates a respective path P2; and the orientation of head 7 in relation to path P2 is maintained unchanged at least at respective portion T.

In the FIG. 1 embodiment, head 4 presents a gripping tool 8 for releasably retaining a respective product 2, and each head 7 provides for performing a number of given operations, e.g. wrapping or surface treating operations, on product 2. More specifically, head 4 is an orientable head, which, at least at each station 5, is adaptable to the position assumed by each head 7 at respective station 5, to set respective product 2 to any position suitable to cooperate with head 7. For which purpose, conveying device 3 comprises an orienting device 9 for adjusting the orientation of head 4 in relation to path P1 and to each path P2 at least at respective station 5.

Device 9 comprises two cranks 10 and 11 hinged to each other at an axis A2 of rotation parallel to axis A1 and separated from axis A1 by a given distance l1. Crank 10 pivots about axis A1, whereas crank 11 is located between crank 10 and head 4, and supports head 4 in rotary manner about a further axis A3 parallel to axis A2 and separated from axis A2 by a given distance l2 smaller than distance l1.

Figure 2:
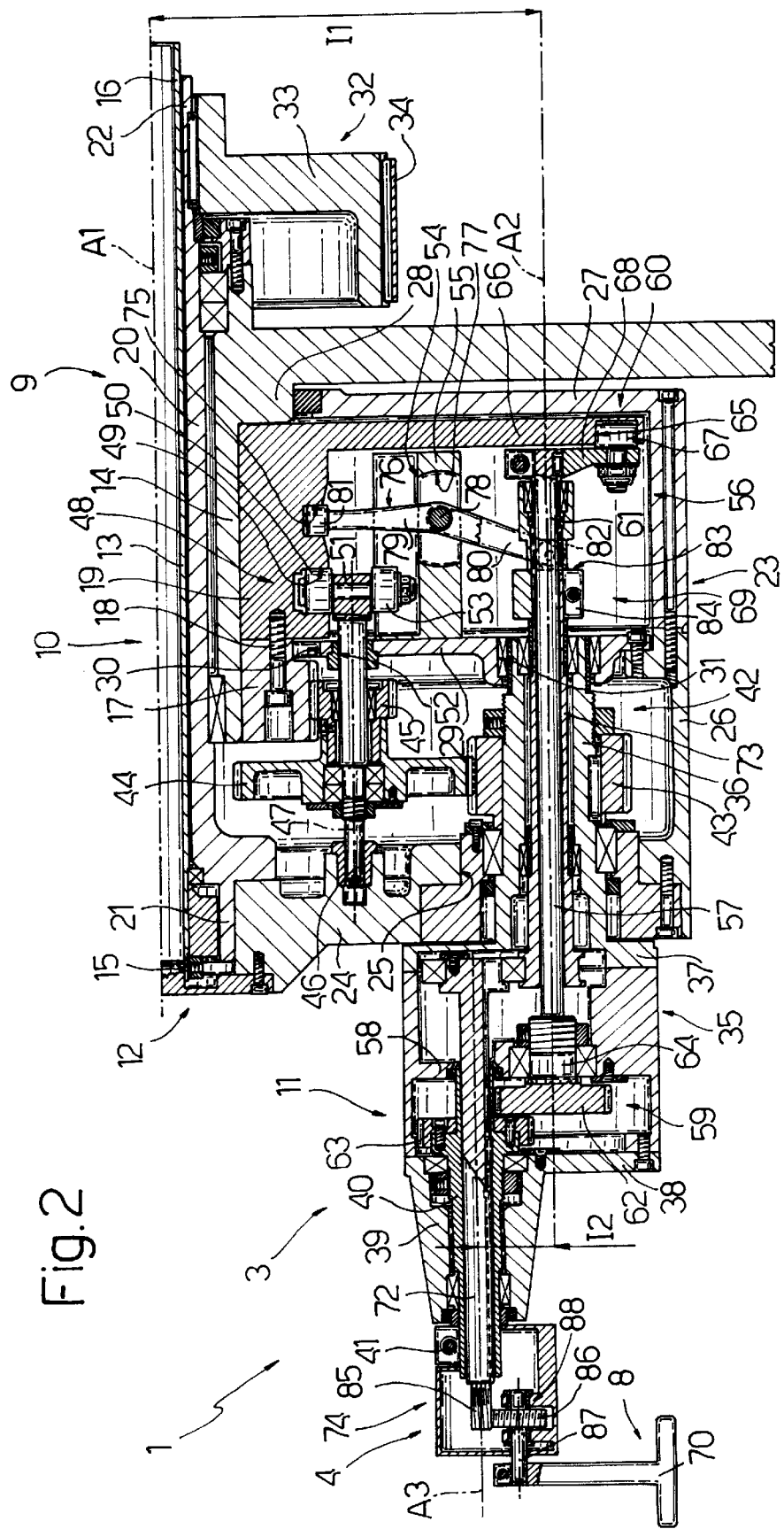
FIG. 2 shows a partially-sectioned view, with parts removed for clarity, of the FIG. 1 unit.

As shown more clearly in FIG. 2, device 3 comprises a frame 12 in turn comprising two tubular shafts 13 and 14 fitted in a fixed position and a given radial distance apart one inside the other and coaxially with axis A1. Shaft 13 presents two end portions 15 and 16 projecting outwards of shaft 14, which, on the portion 15 side, is fitted with a fixed gear 17 connected by means of a number of screws 18 (only one shown) to a tubular body 19 fitted to shaft 14 and forming part of frame 12.

Crank 10 is supported in rotary manner by shafts 13 and 14, and is defined by a tubular shaft 20 extending between and in rotary and axially-fixed manner in relation to shafts 13 and 14, and presenting two end portions 21 and 22 located respectively at portions 15 and 16. Crank 10 is also defined by a cylindrical box body 23 connected rigidly to end portion 21 of shaft 20, and which is coaxial with axis A1 and extends radially between axis A1 and axis A2.

Body 23 comprises a front wall 24 extending from portion 21, crosswise to axis A1, and presenting a through hole 25 coaxial with axis A2; a cylindrical outer wall 26 extending from wall 24 coaxially with axis A1; and a rear wall 27 extending from wall 26, crosswise to axis A1, and substantially contacting a shoulder 28 formed on the outside of shaft 14 and acting as an axial stop for tubular body 19.

Body 23 also comprises an inner partition 29 located between and parallel to walls 24 and 27, and extending from wall 26 towards gear 17, which is fitted through a hole 30 formed through partition 29 and coaxial with axis A1. Partition 29 also presents a further through hole 31 coaxial with axis A2.

Crank 10 is rotated with a first continuous circular movement about axis A1 by an actuating device 32 forming part of orienting device 9, and which comprises a pulley 33 fitted to end portion 22 of shaft 20, and a belt 34 looped about pulley 33 and a further drive pulley (not shown).

Crank 11 is defined by a substantially cylindrical box body 35 extending between axis A2 and axis A3, and is fitted to and in rotary manner in relation to crank 10 by a substantially cylindrical tubular shaft 36 extending coaxially with axis A2 and in rotary and axially-fixed manner from body 35 and through holes 25 and 31 into body 23.

More specifically, body 35 comprises a rear wall 37 facing and substantially contacting wall 24, and defining an end flange of shaft 36; and a front wall 38 parallel to wall 37 and presenting a tubular conical body 39 extending coaxially with axis A3 on the opposite side of wall 38 to wall 37, and which is engaged internally in angularly-free, axially-fixed manner by a tubular shaft 40, the free end 41, outside body 39, of which is fitted with head 4.

Crank 11 is rotated about axis A2 with a second continuous circular movement and with a rotation phase F by a respective actuating device 42 governed by device 32 and forming part of device 9 for orienting head 4. Device 42 comprises two helical gears 43 and 44 meshing with and axially movable in relation to each other, and housed inside body 23, between wall 24 and partition 29; and a further gear 45 angularly integral with gear 44 and meshing with gear 17. More specifically, gear 43 is fitted to shaft 36; and gears 44 and 45 are fitted in rotary manner to a shaft 46 coaxial with its own axis 47 parallel to axis A1 and fitted to and in axially-sliding manner in relation to wall 24 and partition 29.

Since device 42 is fitted inside body 23 of crank 10, and is connected to fixed gear 17 by gear 45, rotation of crank 10 about axis A1 therefore activates device 42 to rotate crank 11 about axis A2, so that the rotation phase F of crank 11 about axis A2 depends on the rotation phase of crank 10 about axis A1, and on the gear ratio of the mechanism comprising gears 17, 45, 44 and 43.

Moreover, to vary phase F during the operation of unit 1, and hence further vary the angular position of crank 11 in relation to crank 10, device 9 comprises a correcting device 48 for axially moving gears 44 and 45 in relation to gears 43 and 17, and which comprises a circumferential groove 49 formed on the outer periphery of body 19 about axis A1, and a tappet roller 50 engaged in rolling manner inside groove 49 and fitted in rotary manner to the end 51 of shaft 46 extending through a respective hole 52 formed through partition 29.

Device 48 also comprises an antirotation roller 53 for preventing roller 50 from rotating about axis 47, and which is connected to end 51, coaxially with roller 50, and is engaged in rolling manner inside a groove 54 parallel to axis A1 and formed in a plate 55 connected rigidly to partition 29 and projecting from partition 29 towards wall 27.

In use, the axial movement of roller 50 imparted by groove 49 as roller 50 rotates about axis A1 changes the axial meshing position of gear 44 in relation to gear 43, so that the continuous circular movement of gear 43 about axis A2, and hence of crank 11 about axis A2, is superimposed by a further rotation of gear 43, which, depending on how gear 44 is shifted, varies phase F and the angular position of crank 11 in relation to axis A2, and therefore also varies the angular position of head 4 in relation to axis A2.

Head 4 may therefore rotate about both axes A1 and A2, and is also rotated with a third circular movement about axis A3 by an actuating device 56 also governed by device 32 and forming part of device 9 for orienting head 4.

In addition to shaft 40, device 56 comprises a further shaft 57 extending, coaxially with axis A2, through and in rotary and angularly-fixed manner in relation to shaft 36, through wall 37 of body 35, and through a partition 58 inside body 35; a gear transmission 59 interposed between shafts 40 and 57 and housed inside body 35, between wall 38 and partition 58; and a positive device 60 connected to the end 61 of shaft 57 located between partition 29 and wall 27, and which provides for rotating shaft 57 about axis A2.

Transmission 59 comprises a gear 62 fitted to the end 64 of shaft 57 opposite end 61; a gear 63 fitted to shaft 40; and a further gear (not shown) located between wall 38 and partition 58, and for connecting gears 62 and 63.

Device 60 comprises an annular groove 65 extending about axis A1 and formed frontally on a flange 66, which is integral with body 19 and located in a fixed position between wall 27 of body 23 and a free end of plate 55. Device 60 also comprises a roller 67 engaging groove 65 in rolling manner and connected angularly to shaft 57 by a lever 68, the free end of which is fitted in rotary manner with roller 67, and the other end of which is fitted to end 61 of shaft 57.

Device 60 cooperates with correcting device 48 to rotate and angularly orient head 4 about axis A3 as crank 10 rotates about axis A1. More specifically, grooves 49 and 65 present respective given profiles extending about axis A1 and so formed that, along each portion T of path P1, head 4, as stated, may be so oriented as to position respective product 2 as best suited to cooperate with head 7.

Finally, head 4 comprises a control device 69 for so controlling gripping tool 8 as to releasably grip a respective product 2. More specifically, in the embodiment shown in FIGS. 1 and 2, tool 8 comprises two gripping elements 70 movable to and from each other and in relation to head 4; and a known piston element 71 (not shown in FIG. 2) located between elements 70 and for assisting the release of product 2.

Device 69 comprises a shaft 72 fitted through and in axially-sliding, angularly-fixed manner in relation to shaft 40; a sleeve 73 fitted between and in axially-sliding, angularly-fixed manner in relation to shafts 36 and 57, and connected axially to one end of shaft 72; and a gear transmission 74 housed inside head 4 and for connecting shaft 72 to elements 70.

Device 69 also comprises a circumferential groove 75 formed on the outer periphery of body 19, about axis A1 and between groove 49 and flange 66; and a rocker arm lever 76, which is fitted movably through an opening 77 formed in plate 55, pivots on a pin 78 fitted at opening 77 so as to rotate about an axis crosswise to axis A1, and in turn comprises two arms 79 and 80 extending radially from opposite sides of pin 78. The free end of arm 79 is fitted in rotary manner with a tappet roller 81 engaged in rolling manner inside groove 75; while the free end of arm 80 is fitted with a further roller 82 engaged inside a circumferential groove 83 formed about a sleeve 84 fitted in rotary and axially-sliding manner to shaft 57, between shaft 57 and lever 68, and connected axially to sleeve 73.

Transmission 74 comprises a helical gear 85 formed at the opposite end of shaft 40 to that engaged axially by sleeve 73, and extending outwards of shaft 40; and, for each element 70, a further helical gear 86 fitted to a respective shaft 87, which in turn is fitted in rotary and axially-fixed manner to a respective support 88 inside head 4, and is connected to one end of respective element 70.

The two gears 86, only one of which is connected angularly to gear 85, are connected angularly to each other by a pair of further known helical gears (not shown) located between gears 86 inside head 4, and which rotate gears 86 in opposite directions to move the free ends of elements 70 to and from each other when shaft 40 and sleeve 73 are moved axially by rocker arm lever 76 oscillating about pin 78.

Operation of unit 1 is clearly understandable from the above description. It should be pointed out, however, that the possibility of combining the three rotary movements of crank 10 about axis A1, of crank 11 about axis A2, and of head 4 about axis A3, and the possibility of correcting rotation phase F of crank 11 about axis A2 by means of correcting device 48, and the rotation of head 4 about axis A3 by appropriately shaping the profile of groove 65, provide for adjusting the orientation of head 4, and hence respective product 2, in any manner, to adapt the orientation of head 4 to the paths P2 of heads 7, and to the orientation of heads 7 at least at manipulating stations 5.

By way of example, FIG. 1 shows a lobed path P1, each portion T of which is preferably, but not necessarily, defined by an arc of a circle connected to the adjacent portions T and with its center at the respective axis A of rotation of respective head 7.

In view of the possible adjustments afforded by unit 1, portions T may even, of course, be straight.

I claim:

1. A unit (1) for manipulating products (2), the unit (1) comprising a conveying device (3) having at least a transfer head (4) for feeding a respective product (2) along a given supply path (P1) extending about a first axis (A1) of rotation and through a number of manipulating stations (5); a manipulating device (6) in turn comprising, for each manipulating station (5), an operating head (7), which is movable along a respective work path (P2) extending about a respective fixed axis (A) parallel to said first axis (A1), has a fixed orientation in relation to the respective work paths (P2), and is capable of performing at least one operation on said product (2) while said product (2) is supported by said transfer head (4); and orienting means (9) associated with said transfer head (4) to vary the orientation of the transfer head (4) in relation to the supply path (P1) and to each work path (P2) at least at each manipulating station (5).

2. A unit as claimed in claim 1, wherein said orienting means (9) comprise a first and second crank (10, 11) hinged to each other at a second axis (A2) of rotation; the second crank (11) being connected in rotary manner to the first transfer head (4) at a third axis (A3) of rotation, and being interposed between the transfer head (4) and the first crank (10); the first crank (10) pivoting at the first axis (A1); and said first, second and third axes (A1, A2, A3) of rotation being parallel to one another.

3. A unit as claimed in claim 2, wherein said orienting means (9) comprise first and second actuating means (32, 42) associated respectively with the first crank (10) and the second crank (11), and for imparting to the first crank (10) a first rotational movement about the first axis (A1), and to the second crank (11) a second rotational movement about the second axis (A2) and simultaneous with the first rotational movement; the first and second rotational movements being continuous rotational movements; and the second rotational movement presenting a given phase (F).

4. A unit as claimed in claim 3, wherein said orienting means(9) comprise third actuating means (56) associated with the transfer head (4), and for imparting to the transfer head (4) a third rotational movement about said third axis (A3); the third actuating means (56) being dependent on said first actuating means.

5. A unit as claimed in claim 4, wherein said second actuating means (42) comprise two helical gears (43, 44) axially movable in relation to each other; said correcting means (48) being connected to one of the two gears (43, 44).

6. A unit as claimed in claim 5, wherein said correcting means (48) comprise a first positive control device (48), which is defined by a circumferential groove (49) extending in a fixed position about the first axis (A1) of rotation and by a tappet roller (50) engaged in rolling manner inside said groove (49), and is connected to one of said two gears (43, 44) to move the gears (43, 44) axially in relation to each other.

7. A unit as claimed in claim 4, wherein said third actuating means (56) comprise a second positive control device (60) defined by a respective annular groove (65) extending in a fixed position about the first axis (A1) of rotation, and by a respective tappet roller (67) engaged in rolling manner inside the respective said groove (65).

8. A unit as claimed in claim 3, wherein said orienting means (9) comprise correcting means (48) associated with said second actuating means (42) to correct said phase (F).

9. A unit as claimed in claim 2, wherein the transfer head (4) comprises a tool (8) cooperating with a respective product (2).

10. A unit as claimed in claim 9, wherein said tool (8) is a gripping tool comprising two gripping elements (70) movable in relation to each other to releasably grip a respective product (2).

11. A unit as claimed in claim 10, further comprising a control device (69) associated with said tool (8) to move said gripping elements (70) to and from each other; the control device (69) being activated by the first crank (10).

12. A unit as claimed in claim 1, wherein said supply path (P1) comprises a succession of given substantially arc-shaped portions (T) extending at least at said manipulating stations (5); each said portion (T) duplicating the respective work path (P2) at least at the respective manipulating station (5).

13. A unit as claimed in claim 12, wherein each said portion (T) is centered at the fixed axis (A) corresponding to the respective manipulating station (5).

14. A unit (1) for manipulating products (2), the unit (1) comprising a conveying device (3) having at least a transfer head (4) for feeding a product (2) along a given supply path (P1) extending about a first axis (A1) of rotation and through a number of manipulating stations (5); a manipulating device (6) in turn comprising, for each manipulating station (5), an operating head (7), which is movable along a respective work path (P2) extending about a respective fixed axis (A) parallel to said first axis (A1), has a fixed orientation in relation to the respective work path (P2), and is capable of performing at least one operation on said product (2) while said product (2) is supported by said transfer head (4); and orienting means (9) associated with the transfer head (4) to vary the orientation of the transfer head (4) in relation to the supply path (P1) and to each work path (P2) at least at each manipulating station (5); the transfer head (4) comprising a gripping tool (8) cooperating with a respective product (2) and having two gripping elements (70) movable in relation to each other to releasably grip a respective product (2); and the unit further comprising a control device (69) associated with said tool (8) to move said gripping elements (70) to and from each other.

15. A unit as claimed in claim 14, wherein said orienting means (9) comprise a first and second crank (10, 11) hinged to each other at a second axis (A2) of rotation; the second crank (11) being connected in rotary manner to the transfer head (4) at a third axis (A3) of rotation, and being interposed between the transfer head (4) and the first crank (10); the first crank (10) pivoting at the first axis (A1); and said first, second and third axes (A1, A2, A3) of rotation being parallel to one another; said control device (69) being activated by the first crank (10).

16. A unit as claimed in claim 15, wherein said orienting means (9) comprise first and second actuating means (32, 42) associated respectively with the first crank (10) and the second crank (11), and for imparting to the first crank (10) a first rotational movement about the first axis (A1), and to the second crank (11) a second rotational movement about the second axis (A2) and simultaneous with the first rotational movement; the first and second rotational movements being continuous rotational movements; and the second rotational movement presenting a given phase (F).

17. A unit as claimed in claim 16, wherein said orienting means (9) comprise correcting means (48) associated with said second actuating means (42) to correct said phase (F).

18. A unit as claimed in claim 17, wherein said orienting means (9) comprise third actuating means (56) associated with the transfer head (4), and for imparting to the transfer head (4) a third rotational movement about said third axis (A3); the third actuating means (56) being dependent on said first actuating means.

19. A unit as claimed in claim 18, wherein said second actuating means (42) comprise two helical gears (43, 44) axially movable in relation to each other; said correcting means (48) being connected to one of the two gears (43, 44).

20. A unit as claimed in claim 19, wherein said correcting means (48) comprise a first positive control device (48), which is defined by a circumferential groove (49) extending in a fixed position about the first axis (A1) of rotation and by a tappet roller (50) engaged in rolling manner inside said groove (49), and is connected to one of said two gears (43, 44) to move the gears (43, 44) axially in relation to each other.

21. A unit (1) for manipulating products (2), the unit (1) comprising a conveying device (3) having at least a transfer head (4) for feeding a respective product (2) along a given supply path (P1) extending about a first axis (A1) of rotation and through a number of manipulating stations (5); a manipulating device (6) in turn comprising, for each manipulating station (5), an operating head (7), which is movable along a respective work path (P2) extending about a respective fixed axis (A) parallel to said first axis (A1), has a fixed orientation in relation to the respective work path (P2), and is capable of performing at least one operation on said product (2), while said product (2) is supported by said transfer head (4); and orienting means (9) associated with the transfer head (4) to vary the orientation of the transfer head (4) in relation to the supply path (P1) and to each work path (P2) at least at each manipulating station (5); said orienting means (9) comprising a first and second crank (10, 11) hinged to each other at a second axis (A2) of rotation, and first and second actuating means (32, 42) associated respectively with the first crank (10) and the second crank (11), and for imparting to the first crank (10) a first rotational movement about the first axis (A1), and to the second crank (11) a second rotational movement about the second axis (A2) and simultaneous with the first rotational movement; the first and second rotational movements being continuous rotational movements; and the second rotational movement presenting a given phase (F).

22. A unit as claimed in claim 21, wherein said second crank (11) is connected in rotary manner to the transfer head (4) at a third axis (A3) of rotation, and is interposed between the transfer head (4) and the first crank (10); the first crank (10) pivoting at the first axis (A1); and said first, second and third axes (A1, A2, A3) of rotation being parallel to one another.

23. A unit as claimed in claim 22, wherein said orienting means (9) comprise correcting means (48) associated with said second actuating means (42) to correct said phase (F).

24. A unit as claimed in claim 23, wherein said orienting means (9) comprise third actuating means (56) associated with the transfer head (4), and for imparting to the transfer head (4) a third rotational movement about said third axis (A3); the third actuating means (56) being dependent on said first actuating means.

25. A unit as claimed in claim 24, wherein said second actuating means (42) comprise two helical gears (43, 44) axially movable in relation to each other; said correcting means (48) being connected to one of the two gears (43, 44).

26. A unit as claimed in claim 25, wherein said correcting means (48) comprise a first positive control device (48), which is defined by a circumferential groove (49) extending in a fixed position about the first axis (A1) of rotation and by a tappet roller (50) engaged in rolling manner inside said groove (49), and is connected to one of said two gears (43, 44) to move the gears (43, 44) axially in relation to each other.

27. A unit as claimed in claim 21, wherein the transfer head (4) comprises a gripping tool (8) cooperating with a respective product (2) and having two gripping elements (70) movable in relation to each other to releasably grip a respective product (2); and a control device (69) activated by said first crank (10) and associated with said tool (8) to move said gripping elements (70) to and from each other.

* * * * *

UNITED STATES PATENT AND TRADEMARK OFFICE
CERTIFICATE OF CORRECTION

PATENT NO. : 5,865,595
DATED : February 2, 1999
INVENTOR(S) : M. Spatafora

It is certified that error appears in the above-identified patent and that said Letters Patent is hereby corrected as shown below:

| COLUMN | LINE | |
|---|---|---|
| [73] Pg. 1, col. 1 | Assignee | "Cotruzioni" shuld read --Costruzioni-- |
| 5 (Claim 4, | 63 line 2) | after "means" (first occurrance) insert a space |
| 6 (Claim 15, | 65 line 2) | after "(10, 11" delete the space |
| 8 (Claim 21, | 9 line 23) | before "11)" delete the space |

Signed and Sealed this

Twentieth Day of June, 2000

Attest:

Q. TODD DICKINSON

*Attesting Officer*      *Director of Patents and Trademarks*